(12) United States Patent
Chen et al.

(10) Patent No.: US 12,338,854 B2
(45) Date of Patent: Jun. 24, 2025

(54) ARTICULATING INTAKE COVER OF AN INFORMATION HANDLING SYSTEM

(71) Applicant: Dell Products L.P., Round Rock, TX (US)

(72) Inventors: Chun I Chen, New Taipei (TW); Chun Yi Chang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 18/311,455

(22) Filed: May 3, 2023

(65) Prior Publication Data

US 2024/0369097 A1 Nov. 7, 2024

(51) Int. Cl.
*G06F 1/16* (2006.01)
*F16C 11/04* (2006.01)
*E05D 7/00* (2006.01)

(52) U.S. Cl.
CPC ............ *F16C 11/04* (2013.01); *G06F 1/1681* (2013.01); *E05D 7/00* (2013.01); *E05Y 2999/00* (2024.05)

(58) Field of Classification Search
CPC ...... G06F 1/1681; G06F 1/1616; G06F 1/203; G06F 1/1637; G06F 1/1656; G06F 1/206; G06F 1/1667; G06F 1/1679; G06F 1/1624; G06F 1/1683; G06F 1/1626; G06F 1/1688; E05D 7/00; E05D 2999/00; F16C 11/04; H05K 5/0213; H05K 5/0217; H05K 5/0086; H05K 5/0234; H05K 5/03; H05K 5/10; H05K 7/16; H05K 7/20145; H05K 7/20163
See application file for complete search history.

(56) References Cited

U.S. PATENT DOCUMENTS

| | | | | |
|---|---|---|---|---|
| 9,501,097 B2* | 11/2016 | Moser | | G06F 1/1649 |
| 11,054,872 B2* | 7/2021 | Wu | | G06F 1/1681 |
| 11,169,575 B2* | 11/2021 | Elsey | | G06F 1/1681 |
| 11,797,058 B2* | 10/2023 | Lin | | G06F 1/203 |
| 2009/0147469 A1* | 6/2009 | Chen | | G06F 1/166 |
| | | | | 361/679.55 |
| 2013/0201617 A1* | 8/2013 | Tsai | | G06F 1/1616 |
| | | | | 361/679.4 |
| 2017/0153677 A1* | 6/2017 | Cheng | | G06F 1/1637 |
| 2018/0210504 A1* | 7/2018 | Moser | | G06F 1/1679 |
| 2019/0278345 A1* | 9/2019 | Ye | | H05K 5/0234 |
| 2020/0142456 A1* | 5/2020 | Hsu | | G06F 1/203 |

(Continued)

OTHER PUBLICATIONS

TWM612418U (Year: 2021).*

*Primary Examiner* — Abhishek M Rathod
(74) *Attorney, Agent, or Firm* — McDermott Will & Emery LLP

(57) ABSTRACT

An apparatus including a first body; an intake cover; a first hinge coupling the intake cover to the first body such that the intake cover is rotatable with respect to the first body about the first hinge; a second body; a second hinge coupling the second body to the first body; a lever coupled to the second hinge, the lever including a shaft; and a lift bar coupled to the first body and rotatable about a first end of the lift bar, wherein the lever is configured to rotate about the second hinge in response to rotation of the second body about the second hinge with respect to the first body such that the shaft of the lever contacts the lift bar to rotate the lift bar to contact the intake cover and rotate the intake cover about the first hinge.

20 Claims, 7 Drawing Sheets

(56) References Cited

U.S. PATENT DOCUMENTS

2021/0089077 A1* 3/2021 Wang ..................... G06F 1/3287
2021/0165453 A1* 6/2021 Townsend ............. G06F 1/1616
2022/0171439 A1* 6/2022 Lin ....................... G06F 1/1681

* cited by examiner

ARTICULATING INTAKE COVER OF AN INFORMATION HANDLING SYSTEM

BACKGROUND

Field of the Disclosure

The disclosure relates generally to an information handling system, and in particular, an articulating intake cover of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The challenge of portable computing devices such as laptops can be temperature control of such, especially during heavy loading.

SUMMARY

Innovative aspects of the subject matter described in this specification may be embodied in an apparatus including a first body; an intake cover; a first hinge coupling the intake cover to the first body such that the intake cover is rotatable with respect to the first body about the first hinge; a second body; a second hinge coupling the second body to the first body; a lever coupled to the second hinge, the lever including a shaft; and a lift bar coupled to the first body and rotatable about a first end of the lift bar, wherein the lever is configured to rotate about the second hinge in response to rotation of the second body about the second hinge with respect to the first body such that the shaft of the lever contacts the lift bar to rotate the lift bar to contact the intake cover and rotate the intake cover about the first hinge.

Other embodiments of these aspects include corresponding systems and apparatus.

These and other embodiments may each optionally include one or more of the following features. For instance, further including a bracket coupling the lift bar to the first body. The lever is coupled to the second hinge at a first end of the lever, wherein the shaft extends from the lever at a second end of the lever opposite to the first end of the lever. The lift bar includes a first curved surface and a second curved surface, wherein a contact surface is positioned between the first curved surface and the second curved surface. The lever is configured to rotate about the first hinge such that shaft of the lever contacts the contact surface of the lift bar to rotate the lift bar. The shaft of the lever contacts the contact surface of the lift bar in response to rotation of the second body about the second hinge with respect to the first body at a first angle between the first body and the second body. The lever is configured to further rotate about the second hinge such that shaft of the lever contacts the second curved surface of the lift bar. The shaft of the lever contacts the second curved surface of the lift bar in response to rotation of the second body about the second hinge with respect to the first body at a second angle greater than the first angle between the first body and the second body. The lever is configured to rotate about the first hinge in response to rotation of the second body about the second hinge with respect to the first body such that the shaft of the lever contacts the lift bar to rotate the lift bar to contact the intake cover and rotate the intake cover about the first hinge from a first state to a second state. The first body further includes a plurality of vents. The apparatus is an information handling system. The second body includes a display device.

Particular implementations of the subject matter described in this specification can be implemented so as to realize one or more of the following advantages. For example, an air intake of the information system can be articulated/rotated to increase airflow to vents of the information handling system to reduce a temperature of the information handling system and minimize performance drop of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
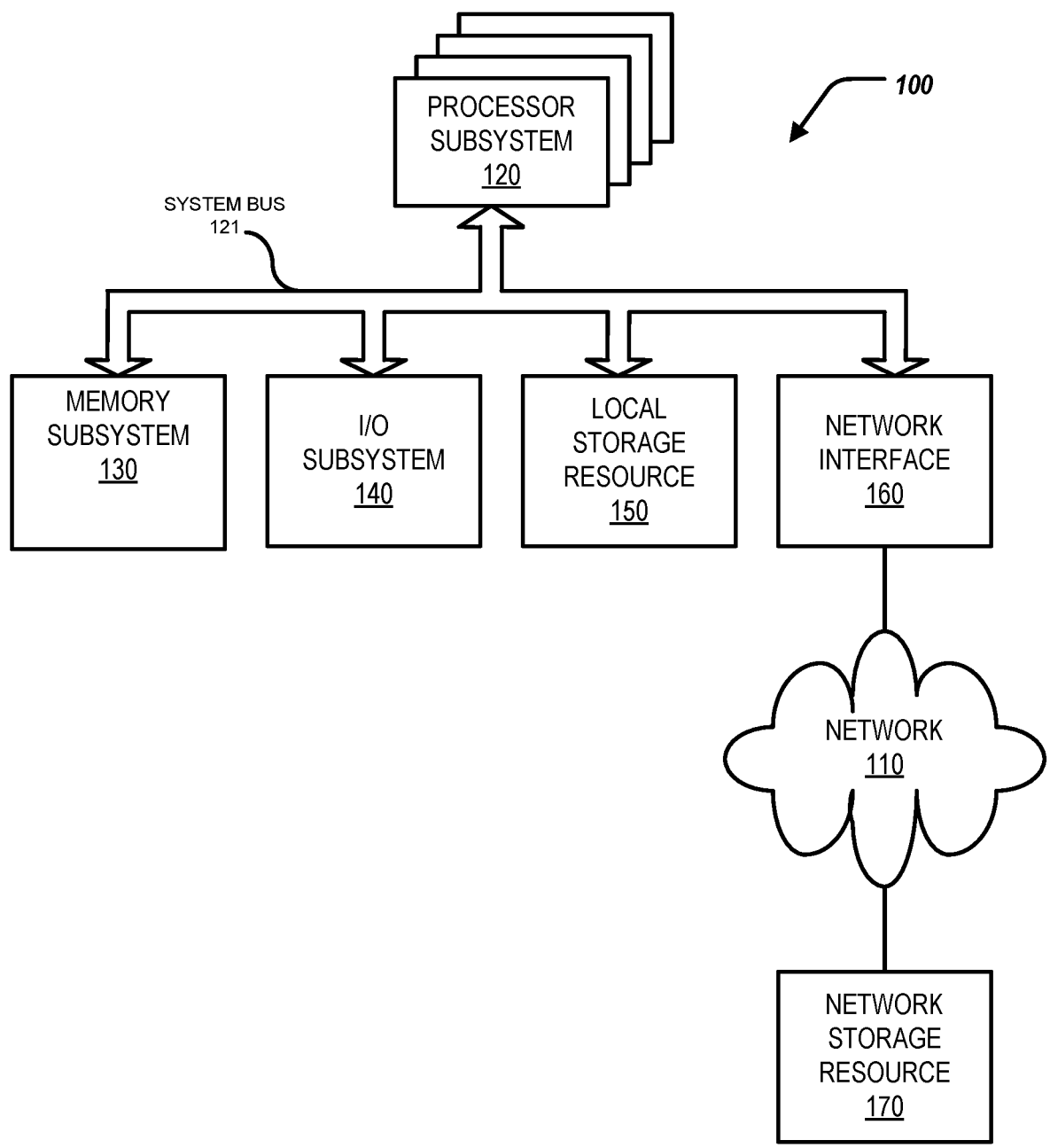
FIG. 1 is a block diagram of selected elements of an embodiment of an information handling system.

This disclosure discusses an articulating intake cover of an information handling system. In short, the air intake cover can be articulated/rotated to improve air intake efficiency for vents of the information handling system. The air intake cover can be articulated/rotated via a combination of movements of a first body, a lever, and a lift bar, described further herein.

Specifically, this disclosure discusses an apparatus, including: a first body; an intake cover; a first hinge coupling the intake cover to the first body such that the intake cover is rotatable with respect to the first body about the first hinge; a second body; a second hinge coupling the second body to the first body; a lever coupled to the second hinge, the lever including a shaft; and a lift bar coupled to the first body and rotatable about a first end of the lift bar, wherein the lever is configured to rotate about the second hinge in response to rotation of the second body about the second hinge with respect to the first body such that the shaft of the lever contacts the lift bar to rotate the lift bar to contact the intake cover and rotate the intake cover about the first hinge.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
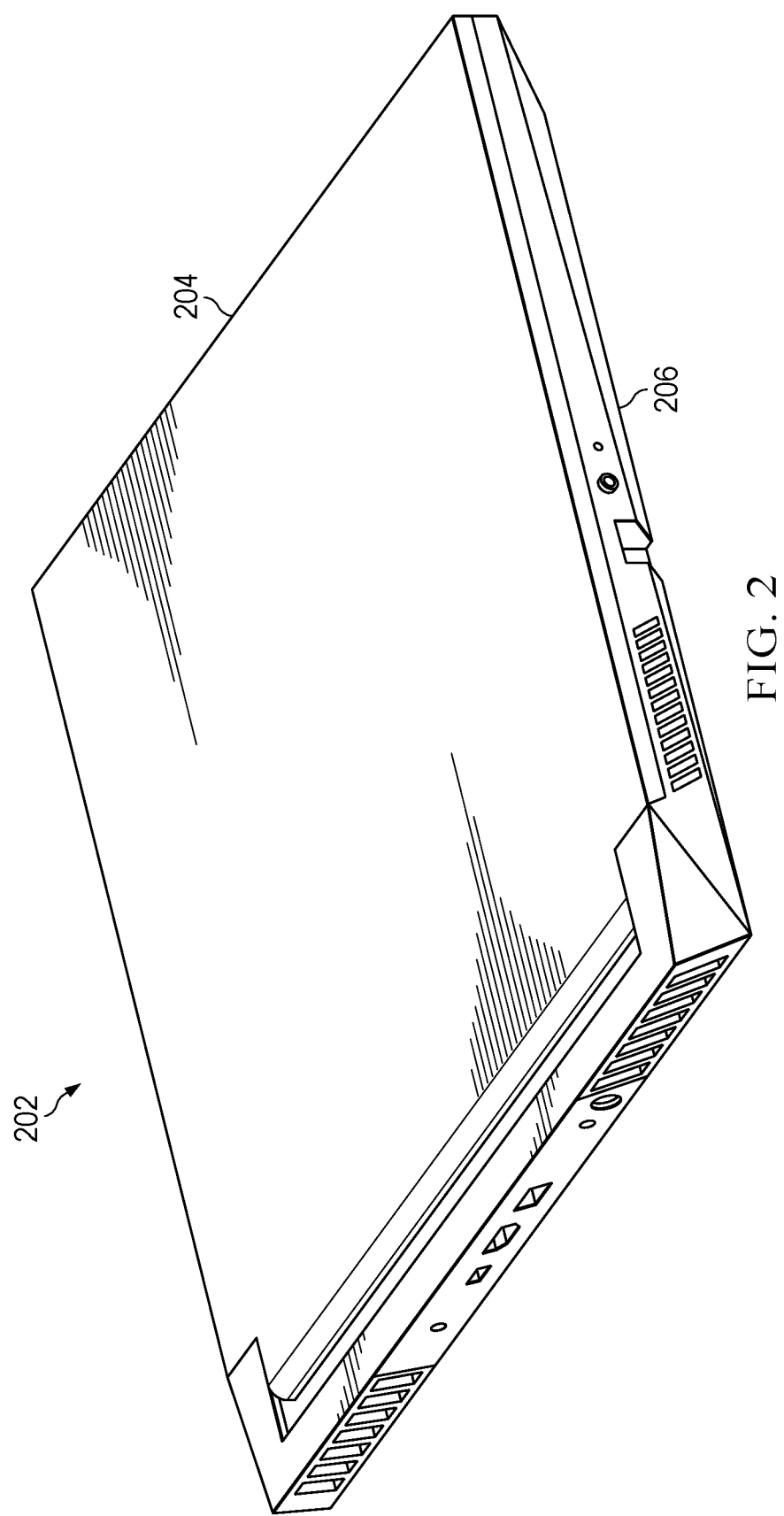
FIG. 2 illustrates a block diagram of an information handling system.

Turning to FIG. 2, FIG. 2 illustrates an environment 200 including an information handling system 202. The information handling system 202 can include a first body 204 and a second body 206. In some examples, the information handling system 202 is similar to, or includes, the information handling system 100 of FIG. 1.

Figure 3A:
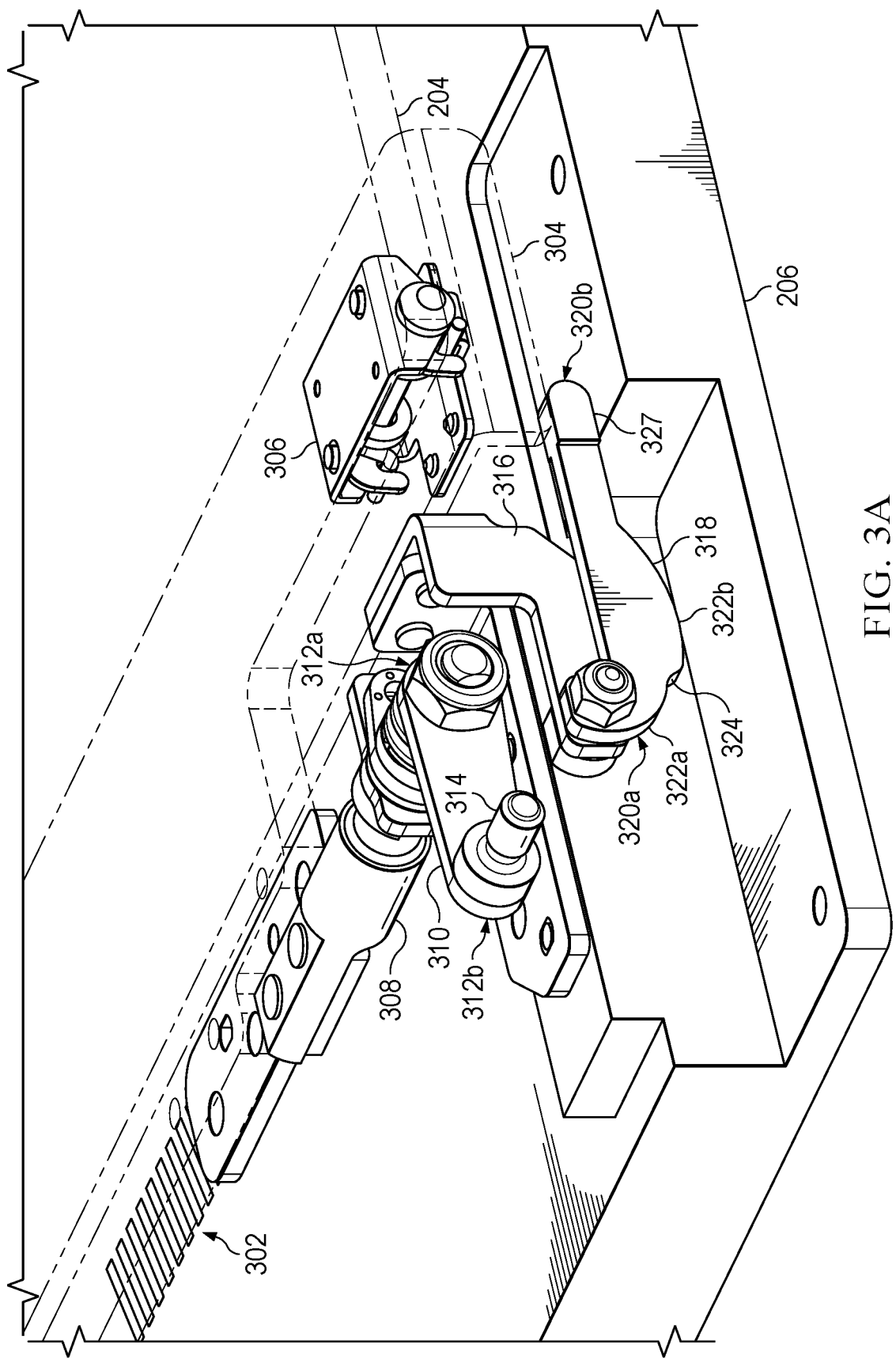
FIGS. 3A, 3B illustrate respective partially transport views of a portion of the information handling system.
Figure 3B:
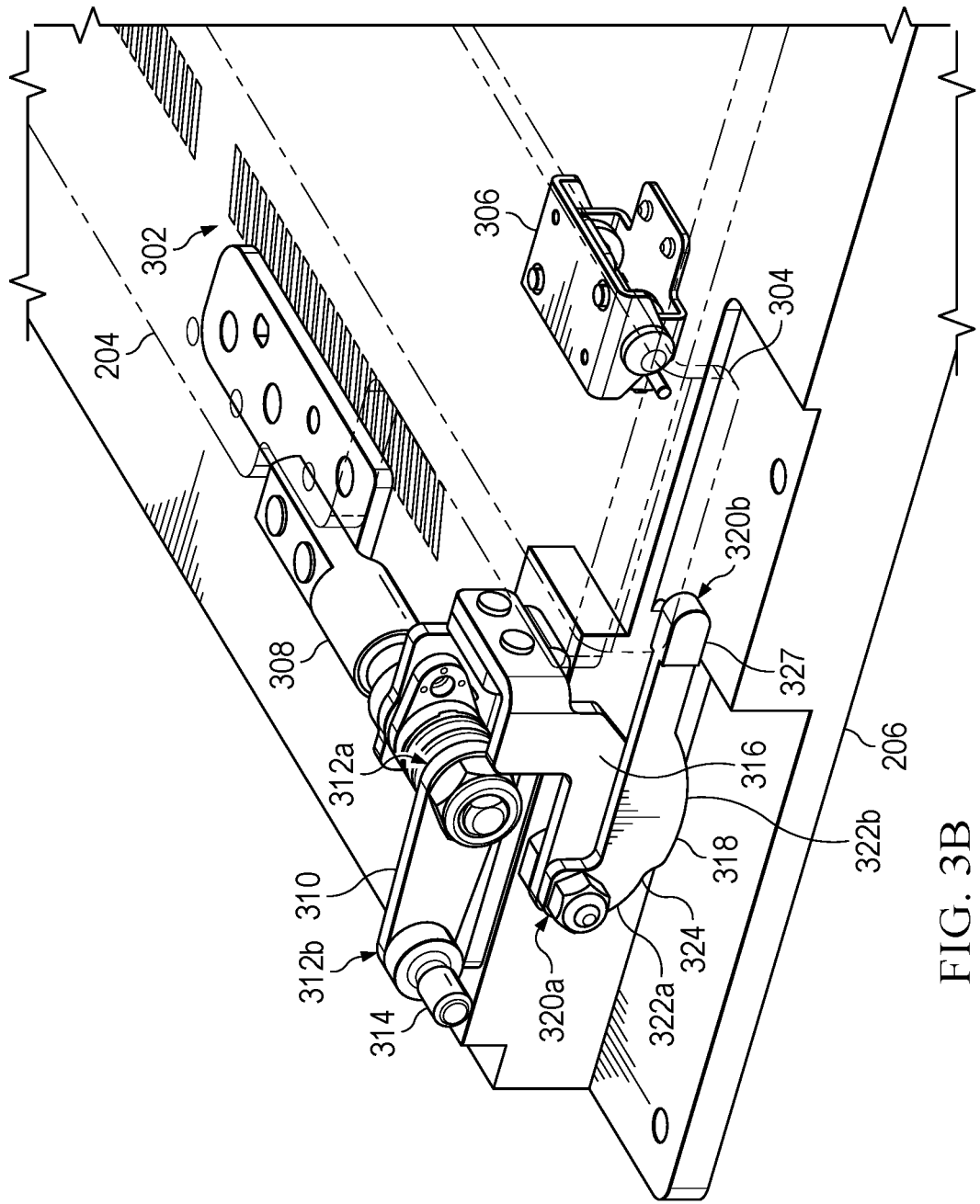

FIGS. 3A, 3B illustrate respective partially transport views of a portion of the information handling system 202, shown in FIG. 2. The information handling system 202 can include the first body 206 and the second body 204. The first body 206 can include a plurality of vents 302 (shown more clearly in FIG. 4). In some examples, the second body 204 can include a display device (e.g., a "screen").

The information handling system 202 can further include an intake cover 304. In some examples, the intake cover 304 can include a secondary display screen.

The information handling system 202 can further include a first hinge 306. The first hinge 306 couples the intake cover 304 to the first body 206. Furthermore, the first hinge 306 can facilitate rotation of the intake cover 304 with respect to the first body 206, described further herein. That is, the intake cover 304 rotates about the first hinge 306 with respect to the first body 206.

The information handling system 202 can further include a second hinge 308. The second hinge 308 couples the first body 206 to the second body 204. Furthermore, the second hinge 308 can facilitate rotation of the second body 204 with respect to the first body 206, described further herein. That is, the second body 204 rotates about the second hinge 308 with respect to the first body 206.

The information handling system 202 can further include a lever 310. The lever 310 is coupled to the second hinge 308. Specifically, the lever 310 includes a first end 312a and a second end 312b, the second end 312b opposite to the first end 312a. The lever 310 is coupled to the second hinge 308 at the first end 312a of the lever 310. The lever 310 can further include a shaft 314. The shaft 314 can extend from the lever 310 at the second end 312b of the lever 310.

The information handling system 202 can further include a bracket 316. The bracket 316 can be coupled to the first body 206.

The information handling system 202 can further include a lift bar 318. The lift bar 318 can be coupled to the first body 206, and specifically, the bracket 316 can couple the lift bar 318 to the first body 206. The lift bar 318 can include a first end 320a and a second end 320b, the second end 320b opposite to the first end 320a. The lift bar 318 is rotatable about the first end 320a. The lift bar 318 can further a first curved surface 322a and a second curved surface 322b. The lift bar 318 can further include a contact surface 324 between the first curved surface 322a and the second curved surface 322b. The lift bar 318 can further include a third surface 327. In some examples, the third surface 327 is flat, or substantially flat.

In short, the intake cover 304 can be articulated/rotated to improve air intake efficiency for the vents 302. The intake cover 304 can be articulated/rotated via a combination of movements of the second body 204, the lever 310, and the lift bar 318, described further herein.

Figure 4:
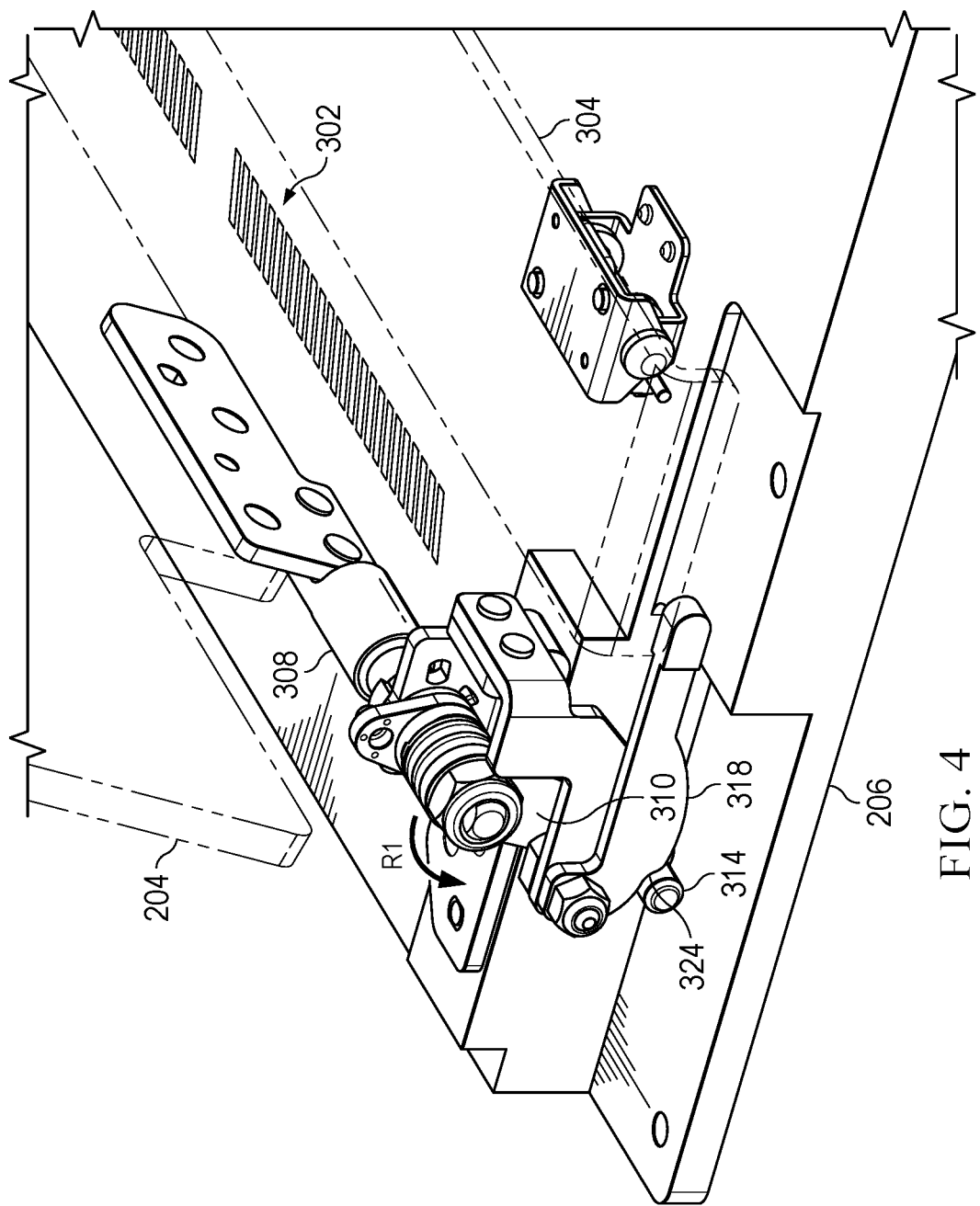
FIGS. 4-6 illustrates respective rotational states of a first body with respect to a second body of the information handling system.
Figure 5:
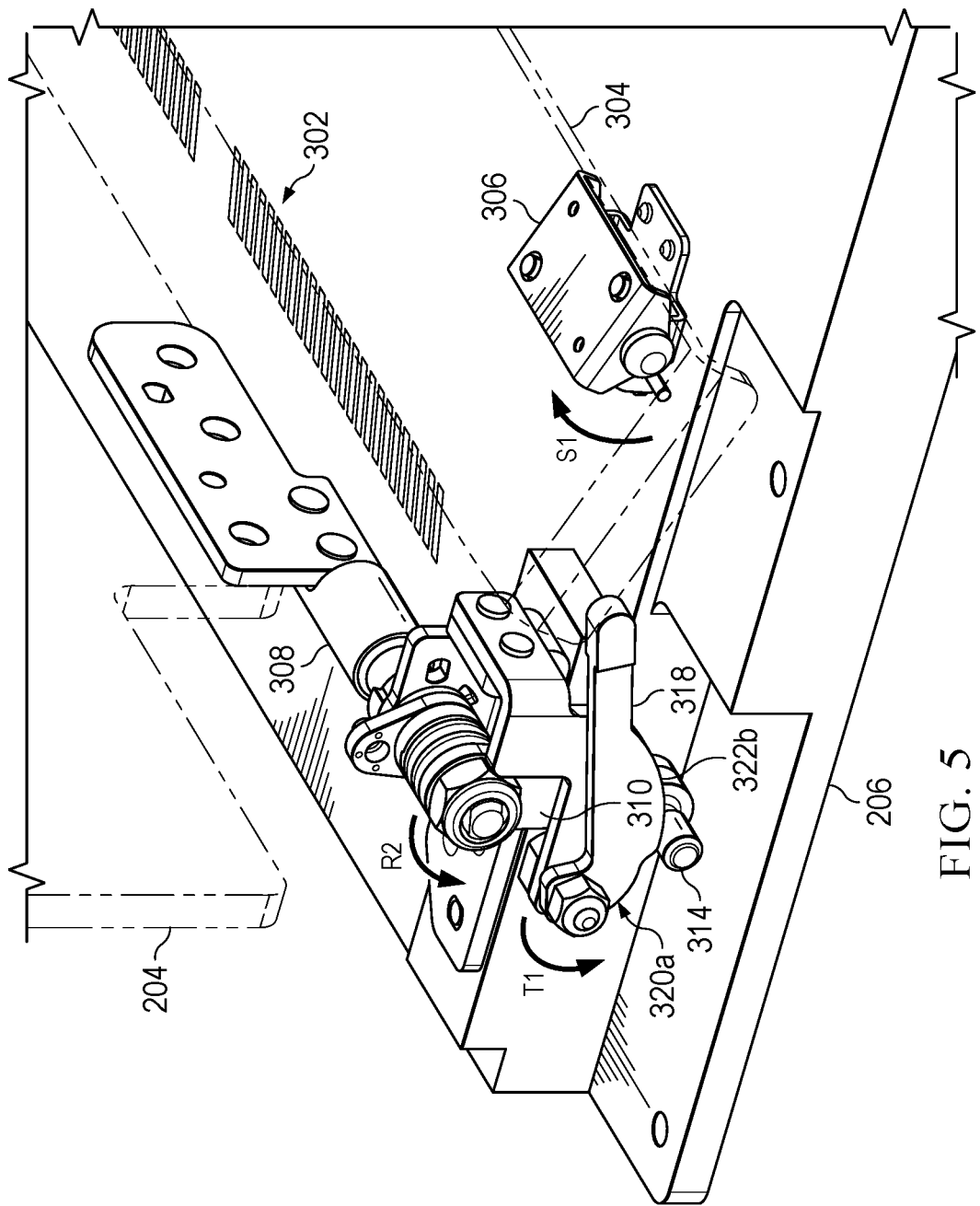
Figure 6:
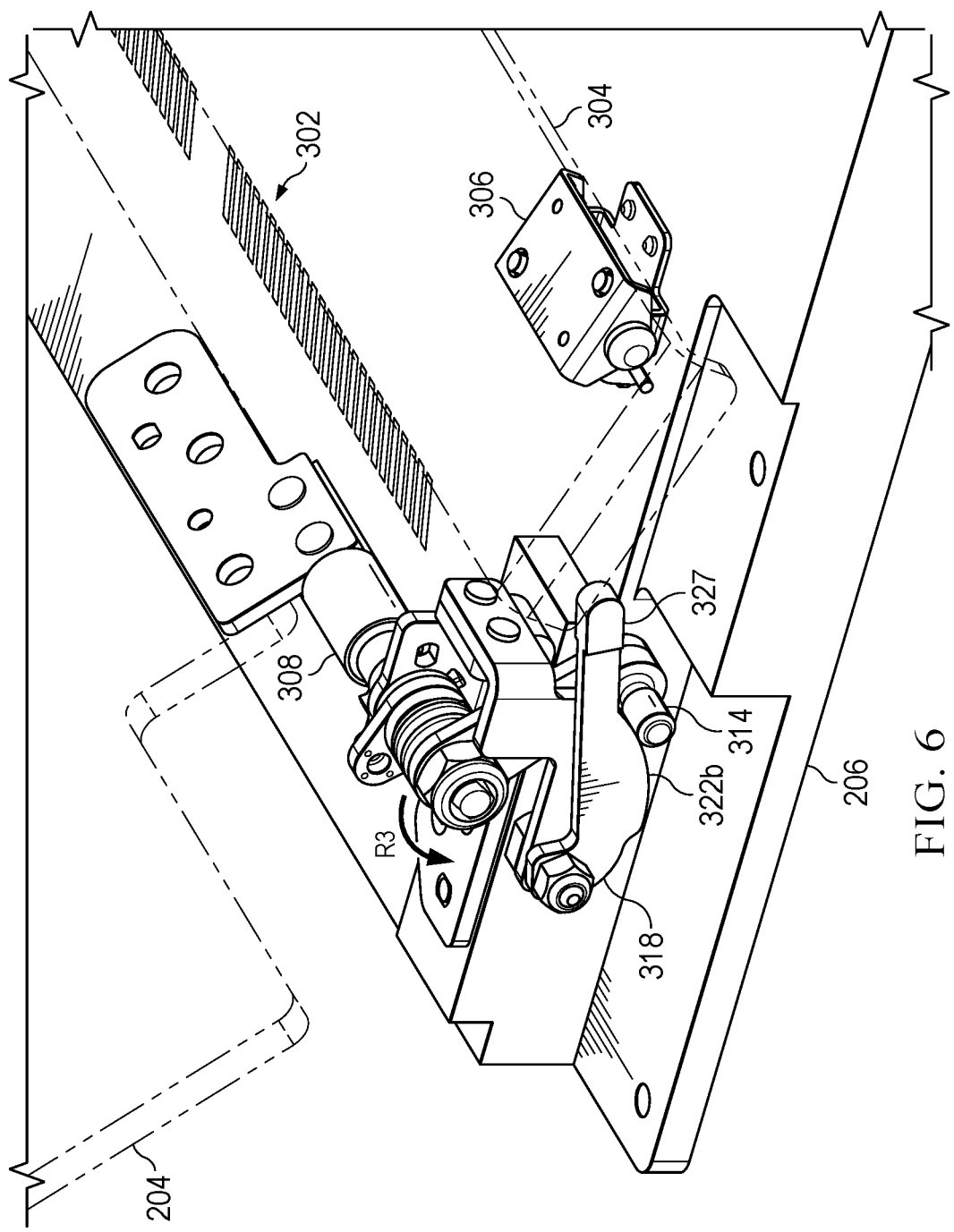

FIGS. 4-6 illustrates respective rotational states of the second body 204 with respect to the first body 206 of the information handling system 202. In particular, referring to FIG. 4, the second body 204 rotates about the second hinge 308 with respect to the first body 206. For example, a user (not shown) of the information handling system 202, can rotate the second body 204 about the second hinge 308 with respect to the first body 206. In response to rotation of the second body 204 about the second hinge 308 with respect to the first body 206, the lever 310 is configured to rotate about the second hinge 208, shown by rotation arrow R1. Furthermore, the rotation of the lever 310 about the second hinge 208 corresponds to the rotation of the second body 204 about the second hinge 208.

To that end, as shown in FIG. 4, the lever 310 rotates about the second hinge 308 such that the shaft 314 of the lever 310 contacts the lift bar 318. Specifically, the lever 310 rotates about the second hinge 308 such that the shaft 314 of the lever 310 contacts the contact surface 324 of the lift bar 318. Furthermore, when the lever 310 rotates about the second hinge 308 such that the shaft 314 of the lever 310 contacts the contact surface 324 of the lift bar 318, the positioning of the intake cover 304 is maintained.

Additionally, when the lever 310 rotates about the second hinge 308 such that the shaft 314 of the lever 310 contacts the contact surface 324 the lift bar 318 in response to rotation of the second body 204 about the second hinge 308 with respect to the first body 206, the second body 204 forms a first angle with respect to the first body 206. In the illustrated example, the second body 204 is rotated about the second hinge 208 to form an angle of approximately 75 degrees between the second body 204 and the first body 206 such that the lever 310, in response, rotates about the second hinge 308 and the shaft 314 of the lever 310 contacts the contact surface 324 of the lift bar 318.

FIG. 5 illustrates further rotation of the second body 204 with respect to the first body 206. Specifically, the second body 204 is further rotated about the second hinge 308 with respect to the first body 206. For example, a user (not shown) of the information handling system 202, can further rotate the second body 204 about the second hinge 308 with respect to the first body 206. In response to the further rotation of the second body 204 about the second hinge 308 with respect to the first body 206, the lever 310 is configured to further rotate about the second hinge 208, shown by rotation arrow R2. Furthermore, the further rotation of the lever 310 about the second hinge 208 corresponds to the further rotation of the second body 204 about the second hinge 208.

To that end, as shown in FIG. 5, the lever 310 further rotates about the second hinge 308 such that the shaft 314 of the lever 310 contacts the lift bar 318 to rotate the lift bar 318. Specifically, the lever 310 further rotates about the second hinge 308 such that the shaft 314 of the lever 310 contacts the second curved surface 322b of the lift bar 318. Furthermore, when the lever 310 further rotates about the second hinge 308 such that the shaft 314 of the lever 310 contacts the second curved surface 322b of the lift bar 318, the lift bar 318 is rotated about the about the first end 320a of the lift bar 318, shown by rotation arrow T1. Furthermore, when the lift bar 318 is rotated about the first end 320a, the lift bar 318 contacts the intake cover 304 to rotate the intake cover 304 about the first hinge 306, shown by rotation arrow S1.

Additionally, when the lever 310 further rotates about the second hinge 308 such that the shaft 314 of the lever 310 contacts the second curved surface 322b of the lift bar 318 such that the lift bar 318 is rotated about the about the first end 320a of the lift bar 318 to contact the intake cover 304 to rotate the intake cover 304 about the first hinge 306, the intake cover 304 forms an angle with respect to the first body 206. In the illustrated example, the second body 204 is rotated about the second hinge 208 to form an angle of approximately 90 degrees between the second body 204 and the first body 206 such that the lever 310, in response, rotates about the second hinge 308 such that the shaft 314 of the lever 310 contacts the second curved surface 322b of the lift bar 318 such that the lift bar 318 is rotated about the about the first end 320a of the lift bar 318 to contact the intake cover 304 to rotate the intake cover 304 about the first hinge 306 to form an angle of approximately 20 degrees.

FIG. 6 illustrates further rotation of the second body 204 with respect to the first body 206. Specifically, the second body 204 is further rotated about the second hinge 308 with respect to the first body 206. For example, a user (not shown) of the information handling system 202, can further rotate the second body 204 about the second hinge 308 with respect to the first body 206. In response to the further rotation of the second body 204 about the second hinge 308 with respect to the first body 206, the lever 310 is configured to further rotate about the second hinge 208, shown by rotation arrow R3. Furthermore, the further rotation of the lever 310 about the second hinge 208 corresponds to the further rotation of the second body 204 about the second hinge 208.

To that end, as shown in FIG. 6, the lever 310 further rotates about the second hinge 308 such that the shaft 314 of the lever 310 contacts the lift bar 318 to maintain the positioning of the lift bar 318. Specifically, the lever 310 further rotates about the second hinge 308 such that the shaft 314 of the lever 310 contacts the third surface 327 of the lift bar 318. Furthermore, when the lever 310 further rotates about the second hinge 308 such that the shaft 314 of the lever 310 contacts the third surface 327 of the lift bar 318, the positioning of the lift bar 318 is maintained with respect to the intake cover 304.

Additionally, when the lever 310 further rotates about the second hinge 308 such that the shaft 314 of the lever 310 contacts the third surface 327 of the lift bar 318 such that the positioning of (angle of) the lift bar 318 is maintained to maintain the positioning of (angle of) the intake cover 304 at the previous angle (fixed angle) with respect to the first body 206. In the illustrated example, the second body 204 is rotated about the second hinge 208 to form an angle of greater than 90 degrees between the second body 204 and the first body 206 such that the lever 310, in response, rotates about the second hinge 308 such that the shaft 314 of the lever 310 contacts the third surface 327 of the lift bar 318 such that the positioning of the lift bar 318 is maintained to maintain the positioning of (angle of) the intake cover 304 at the angle of approximately 20 degrees.

The rotation of the second body 204 and/or intake cover 304 can be based on a curvature of the first curved surface 322a, the second curved surface 322b, and/or the contact surface 324. That is, the first curved surface 322a, the second curved surface 322b, and/or the contact surface 324 can have a respective curvature to define the angle of rotation of the intake cover 304 and/or the second body 204.

In some examples, when the intake cover 304 is rotated with respect to the second body 206 to form an angle with the first body 206, air flow to the vents 302 is increased. Thus, when air flow is increased to the vents 302, cooling of internal components of the information handling system 202 (e.g., located within the first body 206) is improved. For example, when air flow is increased to the vents 302, cooling of such internal components as a central processing unit (CPU), graphics processing unit (GPU), memory modules such as dual in-line memory modules (DIMM), storage devices such as solid-state drives (SSD) of the information handling system 202 (e.g., located within the first body 206) is improved.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, including:
    a first body;
    an intake cover;
    a first hinge coupling the intake cover to the first body such that the intake cover is rotatable with respect to the first body about the first hinge;
    a second body;
    a second hinge coupling the second body to the first body;
    a lever coupled to the second hinge, the lever including a shaft; and
    a lift bar coupled to the first body and rotatable about a first end of the lift bar,
    wherein the lever is configured to rotate about the second hinge in response to rotation of the second body about the second hinge with respect to the first body such that the shaft of the lever transitions from an initial state positioned spaced-apart from the lift bar to a state where the shaft of the lever contacts the lift bar to rotate the lift bar to contact the intake cover and rotate the intake cover about the first hinge.

2. The apparatus of claim 1, further including a bracket coupling the lift bar to the first body.

3. The apparatus of claim 1, wherein the lever is coupled to the second hinge at a first end of the lever, wherein the shaft extends from the lever at a second end of the lever opposite to the first end of the lever.

4. The apparatus of claim 1, wherein the lift bar includes a first curved surface and a second curved surface, wherein a contact surface is positioned between the first curved surface and the second curved surface.

5. The apparatus of claim 4, wherein the lever is configured to rotate about the first hinge such that shaft of the lever contacts the contact surface of the lift bar to rotate the lift bar.

6. The apparatus of claim 5, wherein the shaft of the lever contacts the contact surface of the lift bar in response to rotation of the second body about the second hinge with respect to the first body at a first angle between the first body and the second body.

7. The apparatus of claim 6, wherein the lever is configured to further rotate about the second hinge such that shaft of the lever contacts the second curved surface of the lift bar.

8. The apparatus of claim 7, wherein the shaft of the lever contacts the second curved surface of the lift bar in response to rotation of the second body about the second hinge with respect to the first body at a second angle greater than the first angle between the first body and the second body.

9. The apparatus of claim 1, wherein the lever is configured to rotate about the first hinge in response to rotation of the second body about the second hinge with respect to the first body such that the shaft of the lever contacts the lift bar to rotate the lift bar to contact the intake cover and rotate the intake cover about the first hinge from a first state to a second state.

10. The apparatus of claim 1, wherein the first body further includes a plurality of vents.

11. The apparatus of claim 1, wherein the apparatus is an information handling system.

12. The apparatus of claim 1, wherein the second body includes a display device.

13. An information handling system, including:
    a first body;
    an intake cover;
    a first hinge coupling the intake cover to the first body such that the intake cover is rotatable with respect to the first body about the first hinge;
    a second body including a display device;
    a second hinge coupling the second body to the first body;
    a lever coupled to the second hinge, the lever including a shaft; and
    a lift bar coupled to the first body and rotatable about a first end of the lift bar,
    wherein the lever is configured to rotate about the second hinge in response to rotation of the second body about the second hinge with respect to the first body such that the shaft of the lever transitions from an initial state positioned spaced-apart from the lift bar to a state where the shaft of the lever contacts the lift bar to rotate the lift bar to contact the intake cover and rotate the intake cover about the first hinge from a first state to a second state.

14. The information handling system of claim 13, wherein the lift bar includes a first curved surface and a second curved surface, wherein a contact surface is positioned between the first curved surface and the second curved surface.

15. The information handling system of claim 14, wherein the lever is configured to rotate about the first hinge such that shaft of the lever contacts the contact surface of the lift bar to rotate the lift bar.

16. The information handling system of claim 15, wherein the shaft of the lever contacts the contact surface of the lift bar in response to rotation of the second body about the second hinge with respect to the first body at a first angle between the first body and the second body.

17. The information handling system of claim 16, wherein the lever is configured to further rotate about the second hinge such that shaft of the lever contacts the second curved surface of the lift bar.

18. The information handling system of claim 17, wherein the shaft of the lever contacts the second curved surface of the lift bar in response to rotation of the second body about the second hinge with respect to the first body at a second angle greater than the first angle between the first body and the second body.

19. The information handling system of claim 13, wherein the first body further includes a plurality of vents.

20. The information handling system of claim 13, wherein the second body includes a display device.

* * * * *